(12) United States Patent
Linden

(10) Patent No.: US 9,639,150 B2
(45) Date of Patent: *May 2, 2017

(54) POWERED PHYSICAL DISPLAYS ON MOBILE DEVICES

(76) Inventor: Craig L. Linden, Alpine, CA (US)

( * ) Notice: Subject to any disclaimer, the term of this patent is extended or adjusted under 35 U.S.C. 154(b) by 1833 days.

This patent is subject to a terminal disclaimer.

(21) Appl. No.: 12/172,993

(22) Filed: Jul. 14, 2008

(65) Prior Publication Data

US 2008/0274769 A1    Nov. 6, 2008

Related U.S. Application Data

(63) Continuation of application No. 09/856,228, filed as application No. PCT/US00/21014 on Jul. 31, 2000.

(60) Provisional application No. 60/146,782, filed on Jul. 31, 1999, provisional application No. 60/149,804, filed on Aug. 18, 1999, provisional application No. 60/170,089, filed on Dec. 9, 1999, provisional application No. 60/196,462, filed on Apr. 11, 2000, provisional application No. 60/238,234, filed on Oct. 4, 2000, provisional application No. 60/243,001, filed on Oct. 24, 2000, provisional application No. 60/244,840, filed on Nov. 1, 2000.

(51) Int. Cl.
*H04L 29/06* (2006.01)
*G09B 19/00* (2006.01)
*G06F 3/01* (2006.01)

(52) U.S. Cl.
CPC .............. *G06F 3/011* (2013.01); *G09B 19/00* (2013.01); *H04L 29/06* (2013.01); *A63F 2300/1037* (2013.01); *H04L 67/38* (2013.01)

(58) Field of Classification Search
CPC .. H04N 7/15; H04N 21/4126; H04N 21/6131; H04N 7/14; H04N 7/141; H04N 7/144; H04N 7/157; H04L 65/403
USPC ....................................... 455/344–346, 556.1
See application file for complete search history.

(56) References Cited

U.S. PATENT DOCUMENTS

| | | |
|---|---|---|
| 2,972,140 A | 2/1961 | Hirsch |
| 4,117,542 A | 9/1978 | Klausner |
| 4,300,129 A | 11/1981 | Cataldo |
| 4,304,968 A | 12/1981 | Klausner |

(Continued)

FOREIGN PATENT DOCUMENTS

| | | |
|---|---|---|
| DE | 3009040 | 5/1982 |
| WO | 9711530 | 3/1997 |

*Primary Examiner* — Christopher M Brandt
*Assistant Examiner* — Jing Gao
(74) *Attorney, Agent, or Firm* — Gina M. Lupino

(57) ABSTRACT

In certain embodiments, a mobile electronic apparatus for facilitating live physical communications with a remote person includes a transducer configured to sense a physical gesture performed by a user of the device; a physical display apparatus configured to convert energy into physical movement; a processor operatively connected to the transducer and to the physical display apparatus, the processor configured to generate an output signal corresponding to the physical gesture and to interpret an input signal to determine a physical action associated with an input signal; and a communications interface configured to send output signals to a data network and to receive input signals from said data network. In some embodiments, the physical display system is configured to produce the physical action substantially immediately after the input signal is received.

36 Claims, 6 Drawing Sheets

California

Boston

(56) References Cited

U.S. PATENT DOCUMENTS

| | | | | |
|---|---|---|---|---|
| 4,336,524 A | | 6/1982 | Levine | |
| 4,378,551 A | | 3/1983 | Drapac | |
| 4,421,953 A | | 12/1983 | Zielinski | |
| 4,872,005 A | | 10/1989 | DeLuca | |
| 4,874,166 A | | 10/1989 | Kuna | |
| 4,905,001 A | | 2/1990 | Penner | |
| 4,923,428 A | | 5/1990 | Curran | |
| 4,938,483 A | | 7/1990 | Yavetz | |
| RE33,559 E | | 3/1991 | Fallacaro | |
| 5,047,952 A | | 9/1991 | Kramer | |
| 5,142,803 A | | 9/1992 | Lang | |
| 5,181,009 A | | 1/1993 | Perona | |
| 5,225,826 A | | 7/1993 | DeLuca | |
| 5,279,607 A | | 1/1994 | Schentag | |
| 5,359,182 A | | 10/1994 | Schilling | |
| 5,388,992 A | | 2/1995 | Franklin | |
| 5,414,444 A | | 5/1995 | Britz | |
| 5,416,695 A | * | 5/1995 | Stutman et al. | 600/300 |
| 5,470,081 A | | 11/1995 | Sato | |
| 5,474,082 A | | 12/1995 | Junker | |
| 5,491,507 A | | 2/1996 | Umezawa | |
| 5,553,609 A | | 9/1996 | Chen | |
| 5,617,468 A | | 4/1997 | Nojima | |
| 5,629,594 A | | 5/1997 | Jacobus | |
| 5,646,593 A | | 7/1997 | Hughes | |
| 5,704,791 A | * | 1/1998 | Gillio | 434/262 |
| 5,709,219 A | * | 1/1998 | Chen et al. | 600/595 |
| 5,719,918 A | | 2/1998 | Serbetciouglu | |
| 5,746,602 A | * | 5/1998 | Kikinis | 434/169 |
| 5,748,103 A | | 5/1998 | Flach | |
| 5,760,705 A | | 6/1998 | Glessner | |
| 5,784,052 A | | 7/1998 | Keyson | |
| 5,898,599 A | | 4/1999 | Massie | |
| 5,913,727 A | * | 6/1999 | Ahdoot | 463/39 |
| 5,956,484 A | | 9/1999 | Rosenberg | |
| 5,960,367 A | | 9/1999 | Kita | |
| 5,977,867 A | | 11/1999 | Blouin | |
| 5,977,951 A | | 11/1999 | Daniel | |
| 5,984,880 A | * | 11/1999 | Lander et al. | 600/595 |
| 5,987,519 A | * | 11/1999 | Peifer | A61B 5/0022 709/205 |
| 5,989,099 A | | 11/1999 | Arnold | |
| 5,993,001 A | * | 11/1999 | Bursell | G06F 19/321 348/E13.014 |
| 6,012,961 A | | 1/2000 | Sharpe | |
| 6,022,273 A | | 2/2000 | Gabai | |
| 6,028,593 A | | 2/2000 | Rosenberg | |
| 6,075,195 A | | 6/2000 | Gabai | |
| 6,091,857 A | * | 7/2000 | Shaw et al. | 382/251 |
| 6,094,188 A | * | 7/2000 | Horton et al. | 345/158 |
| 6,160,986 A | | 12/2000 | Gabai | |
| 6,161,126 A | | 12/2000 | Weis | |
| 6,171,237 B1 | * | 1/2001 | Avitall | A61B 10/00 128/920 |
| 6,211,861 B1 | | 4/2001 | Rosenberg | |
| 6,253,058 B1 | | 6/2001 | Murasaki et al. | |
| 6,253,061 B1 | | 6/2001 | Helferich | |
| 6,259,806 B1 | * | 7/2001 | Green | 382/128 |
| 6,358,111 B1 | | 3/2002 | Fong | |
| 6,494,762 B1 | | 12/2002 | Bushmitch | |
| 6,522,883 B2 | * | 2/2003 | Titmuss et al. | 455/445 |
| 6,744,370 B1 | | 6/2004 | Sleichter | |
| 6,785,563 B2 | | 8/2004 | Tsukamoto | |
| 6,925,357 B2 | | 8/2005 | Wang | |
| 6,963,762 B2 | | 11/2005 | Kaaresoja | |
| 6,992,565 B1 | | 1/2006 | Giesler | |
| 7,222,000 B2 | | 5/2007 | Wang | |
| 7,260,420 B2 | | 8/2007 | Patino | |
| 7,289,883 B2 | | 10/2007 | Wang | |
| 7,310,570 B2 | | 12/2007 | Wang | |
| 7,328,671 B2 | | 2/2008 | Kates | |
| 7,593,030 B2 | | 9/2009 | Wang | |
| 2001/0031603 A1 | | 10/2001 | Gabai | |
| 2001/0031652 A1 | | 10/2001 | Gabai | |
| 2002/0065682 A1 | * | 5/2002 | Goldenberg | G06F 19/324 705/2 |
| 2002/0107591 A1 | | 8/2002 | Gabai | |
| 2007/0049301 A1 | | 3/2007 | Mock | |

* cited by examiner

POWERED PHYSICAL DISPLAYS ON MOBILE DEVICES

CROSS-REFERENCE TO RELATED APPLICATIONS

This application is a continuation of U.S. patent application Ser. No. 09/856,228, titled METHOD AND APPARATUS FOR POWERED INTERACTIVE PHYSICAL DISPLAYS, for which the last of the 35 U.S.C. §371(c)(1), (c)(2), and (c)(4) requirements were received in the United States Patent and Trademark Office on May 16, 2001, which is a National Stage of International Application No. PCT/US2000/021014, filed Jul. 31, 2000, which claims priority to U.S. Provisional Patent Application No. 60/146,782, titled RIMI-ROTDS, filed Jul. 31, 1999, U.S. Provisional Patent Application No. 60/149,804, titled BIRDS, filed Aug. 18, 1999, U.S. Provisional Patent Application No. 60/170,089, titled WBEM, filed Dec. 9, 1999, U.S. Provisional Patent Application No. 60/196,462, filed Apr. 11, 2000, U.S. Provisional Patent Application No. 60/238,234, filed Oct. 4, 2000, U.S. Provisional Patent Application No. 60/243,001, filed Oct. 24, 2000, and U.S. Provisional Patent Application No. 60/244,840, filed Nov. 1, 2000. The entire contents of each of the above-referenced applications are incorporated by reference herein and made a part of this specification.

BACKGROUND

Field

This disclosure relates to human-machine interaction technology and, in particular, to powered physical displays on mobile electronic devices.

Description of Related Art

One-way telemanipulation and artificial intelligence are used for remotely controlling apparatus such as robots, spacecraft, aircraft and deep sea drones, remote weapons, robotic hands, limbs, machines, wearable bodysuits, gloves, dolls, toys, virtual computer generated objects, etc. These systems and devices are typically pre-programmed, controlled by computer software, remotely controlled by live human input via human/machine interfaces, or some combination thereof. One-way human/machine input control devices include keyboards, joysticks, mice, touch screens, wearable haptic gloves, manipulable mechanical arms, voice, etc.

User interactive forms of the above-mentioned human-machine interfaces are also available with remote sensor feedback information or force-feedback information to the user. Force-feedback devices and associated programming was first developed for virtual reality simulation training systems. Products with force-feedback and tactile-feedback technology also exist.

James Kramer's U.S. Pat. No. 5,047,952 discloses a communication system for deaf, deaf-blind, or non-vocal individuals using an instrumented glove. There are several other patents related to transmitting Braille and other tactile-based languages based on tactile keys, gloves, and moving hand-manipulatable objects. Fallacaro's U.S. Pat. RE 33,559 (reissued from teachings are limited to the one-way transfer of tactile forces via wearable gloves, etc. to enhance audio and/or visual presentations.

Perry Arnold's U.S. Pat. No. 5,989,099 discloses a hand operated self-contained articulated tactile device that is small enough to be concealed in the hand of a user. The device generates signals when the user manually moves a first articulated member in relation to the body of the device. The device can receive remote signals from like devices, which automatically move the second articulated member of the device. The articulated members may produce up to eight signals via various member positioning. The Arnold device works with fine discrete movements that generate and transceive signals related to a signaling-type language, etc. Up to 16 different positions are required by the Arnold device's small input manipulable object and its automatic moving counterpart to transceive a set of eight characters. The primary purpose of the device is for covert tactile signaling when auditory and visual contact is not encouraged, allowed, or possible. When only one user uses one of the devices, the second articulated member's automatic movement is controlled by a pattern of pre-recorded signals from the memory. The power supply for the device is a miniature type battery.

Dan Kikinis's U.S. Pat. No. 5,746,602 discloses a PC peripheral interactive doll for teaching, entertaining, and habituating a child, which includes a microphone, a speaker, and servo-mechanisms for providing doll motion, such as eye, mouth and limb movement, controlled by CD-ROM disks, etc. However, the interaction is limited to pre-recorded information, and the doll is not designed to exchange physical gestures with the user. Additionally, the doll requires a PC host computer.

Damon Danieli's U.S. Pat. No. 5,977,951 discloses a system and method for substituting an animated character when a remote controlled physical character is unavailable. Oz Gabi's U.S. Pat. No. 6,022,273 discloses an interactive doll apparatus, which is wirelessly computer controlled.

As briefly mentioned above, some virtual reality devices, robotic systems, and associated haptic and touch devices include force-feedback technology, degrees of artificial intelligence ("AI") and related computational programs and communication systems. Typical force-feedback enabled input/output devices may include joysticks, computer mice, advanced wearable gloves, bodysuits, and various types of multi-axis manipulator arms and systems. The typical devices being controlled at the other end are virtual objects or powered robotic structures purposed designed to perform various tasks.

Robotic end devices may use force-feed back structures and AI to send information back to the user's input controllers and systems, thus allowing higher levels of telerobotics.

Remote cameras and local monitors may also be used to further guide the operator and to provide him/her with additional telepresence information.

Force-feedback devices are now used in several fields, such as software-based computer/TV games, pre-programmed tactile sensing of on-screen objects and cursor events. Additionally such consumer devices are used for pre-programmed multi-player Internet and home games, training for surgeries, remote surgical operations, arcade and home-based simulated auto racing applications, etc.

Howard Rhiengold's 1991 book, "Virtual Reality" predicted high tech bodysuits connecting people via the Internet for physical interaction. Griore C. Burdea's 1996 book, "Force and Touch Feedback for Virtual Reality," mentions a demonstration of computer networked bodysuits that allowed two persons to remotely interact. Ahdoot's U.S. Pat. No. 5,913,727 teaches a remote multiplayer interactive and contact simulation game (i.e., for kick boxing, etc.), which requires at least two bodysuits, a complex body positioning system, computers, and monitors for the players to compete. A Jun. 19, 2000 Time Magazine article on page 62 by Joel Stein mentioned that the Vivid Corporation has developed a high tech bodysuit retailing for $200,000 for experiencing physical interaction via the Internet.

Elaine Chen's U.S. Pat. No. 5,709,219 proposes a system for providing haptic information to a human operator utilizing force-signal computational display devices that dynamically convey touch sensations. Thomas Massie's U.S. Pat. No. 5,898,599 filed in 1993 mentioned the possibility of using his force-feedback finger-attaching manipulation apparatus to enable human physical interaction over the Internet.

Lois Rosenberg's U.S. Pat. No. 5,956,484 discloses a method for sending forcefeedback data files over the Internet and local networks supporting TCP/IP protocols, including the use of such force-feedback devices such as joysticks, mice, and steering wheels. Rosenberg's patent also mentions the potential use of force-feedback devices over the Internet to allow persons to physically interact, although he also mentions the possibility of transmission time ("latency") delays associated with transmitting forcefeedback information.

Ralph Lander's U.S. Pat. No. 5,984,880 discloses a prerecorded media (CDROMs, etc.) force-feedback system for controlling tactile stimulation and inducing forced human limb movement. Lander also proposes use of remote human interaction via use of forcefeedback computational based programs and force-back joysticks, tactile-feedback computer touch pads. Lander's proposed force-feedback devices are completely sealed with dermatologically compatible material. Charles Jacobus's U.S. Pat. No. 5,629,594 discloses a force-feedback system and method for providing tactile virtual reality to a user.

SUMMARY

Some embodiments generally relate to methods and devices that enable living beings to interact with machines. Interaction may take place directly between a human and a machine equipped with physical input transducers and physical displays.

Interaction may also be indirect, for instance when a machine performs a requested function for a human without actual machine-to-human contact. Control of human interactive machines can be local or remote or a combination. Various interconnection technologies can be used, such as RF, IR, wires, or tubes for pneumatic or hydraulically powered systems. Control input media, for example may be physical movement or pressure, electronic (analog or digital), voice, brain waves, etc.

In accordance with some embodiments, various forms and applications of interactive powered display apparatuses and methods are disclosed for direct and indirect interaction with living beings. These powered displays deliver, and in some embodiments also transmit, signals or energy in various forms for the enhancement of human-to-human communications, remote medical care, treatment, therapy, eldercare, childcare, customer care, maintenance, games, entertainment, training and other applications. The operations of the interactive powered displays are preferably coordinated with live audio or audiovisual communications between two or more persons, or in certain applications for interaction or care of remotely located pets, etc. Some embodiments may be integrated with distinct devices, and visa versa. For example, a powered hugging teddy bear, with an integrated phone allowing a daughter in California to receive live hugs and voice from her dad in Boston.

Some embodiments are capable of delivering physical motion and actions similar to human-to-human gestures, such as hugging, hand holding, hand squeezes, etc. Powered physical display movements and energy displays can enable the local or remote delivery of various energy forms such as electric, mechanical, pneumatic, hydraulic, etc. or combinations thereof.

Certain embodiments provide multiple interactive methods and devices for fast and responsive physical and/or electronic stimulation activity, in coordination with remote live audio and/or visual communications.

Certain embodiments provide similar devices without communications capabilities. Some embodiments provide one-way communicating and/or remotely or local powered devices that physically and/or electronically interact with single or multiple users. In one application, powered physical displays will be in the form of remotely controlled interactive medicine, treat or object-type award vaults for releasing pills or liquid medications, treats, etc. to patients, kids, and for real-time awards for remotely located multi-player game contestants. Pill delivery and proper ingestion can be monitored via audiovisual communications with a supervising nurse.

Some embodiments provide end user physical input and/or output devices adaptable to be used with various types of private or public communication systems, such as land-based telephone systems, digital and/or analog cellular systems, computer networks, cable systems, fiber optic systems, satellite systems, etc. Local connections to such systems or local device interconnections may be wire, wireless, or by tubes for fluid powered devices.

Certain embodiments provide physically and/or electronically interactive communication enabled end user devices adaptable for use with various entertainment, business, and industrial-based interactive single or multimedia systems. Some embodiments provide physically and/or electronically interactive communication enabled end user devices adaptable for use with various other distinct devices. Examples of such devices are interactive and noninteractive TV, radio, computers, games, virtual reality programming, phones, pagers, GPS devices, force-feedback devices, software, various types of controllers, simulators, trainers, artificial intelligence systems, robotics, etc.

Certain embodiments provide physically and/or electronically interactive end user apparatuses and/or methods as a subsystem for manufacturer-based and/or aftermarket integration with various host products and devices. For example, some embodiments add physically and/or electronically interactive features and/or functionality to phones, pagers, computers, TVs, handheld personal digital assistants devices (PDAs). Additional integration candidate devices are: global positioning devices (GPS), industrial, commercial and religious devices, music, games, sporting, tug-of-war, arm wrestling devices, toys, tools, dolls, stuffed animals/characters, gambling, organizers, medical, therapy, eldercare and childcare devices. Devices for remote interactive play and training of pets and other animals are also candidates for integration.

Certain embodiments provide physically and/or electronically interactive end user apparatuses that communicate with one or more sister type devices and/or with distinct devices. Some embodiments provide interactive powered display apparatuses that can be remotely controlled to deliver, in real-time, one or more stimuli, such as electrical, electronic, light, heat, infrared, hydraulic, pneumatic, mechanical movement or force, etc. These end-user display apparatuses and associated service and business methods are for various forms of therapy, medical care, treatments, exercise programs, diet programs, mental health, muscle or skin toning, single or multi-player games, sports, gambling, and entertainment.

Some embodiments provide physically interactive transceiving apparatuses and/or methods that allow a parent or loved one to send and/or receive physical motions and actions to, for instance, to their remotely located kids at school, or elders in care situations. For example, physically interactive pager-like pendant devices on neck chains may optionally include text, voice and/or video communication functionality. Dad or mom, while at work, can transceive or transmit caring hand squeezes or other movements or machine actions to little Johnny or Suzy without disturbing the classroom and without the requirement of host computers.

In certain embodiments, various different energy sources (local or remote) may be selected by a product designer to best serve the specific application, for example only, mechanical, stored human power, springs, pneumatic, hydraulic, electrical, etc.

Some embodiments provide physically interactive end user apparatuses that are used in conjunction with more common types of end user communication devices, such as telephones, videophones, cellular phones, video and/or audio computer conferencing, textual communications, etc. The ideal is to coordinate live voice and/or video communications with physical interaction. For example, a husband calls his wife on his cell phone and says, "I love you darling", he then squeezes his phone and his wife's phone expands in her hand as she receives his real-time touch or hand squeeze. The wife may then send a hand squeeze to her husband, thereby providing a more complete and physically realistic human interaction, similar to when two or more persons physically interact while face-to-face.

Certain embodiments provide end user display apparatuses and methods that communicate with similar devices, or appropriately designed distinct devices, in a smooth and orderly fashion. Some embodiments include methods and apparatus, which avoid the communications breakdown that can occur when two persons talk at the same instant.

By coordinating physical display delivery with other real-time live human communications, some embodiments reduce the data "cross talk" problems likely to be associated with prior art designs. Additionally, some embodiments, in certain dual-interactive applications and forms, separate input and output functions, thereby additionally helping to minimize crossed signals.

These as well as further features, objects and advantages will become more fully apparent from consideration of the ensuing description and annexed drawings of the embodiments.

DETAILED DESCRIPTION OF PREFERRED EMBODIMENTS

Although not intended to list all the disadvantages related to previous technologies, generally prior art methods, systems and devices present one or more of the following disadvantages or limitations: a) prior art force-feedback devices with required computers and associated communication transmission delays; b) prior art requirement of host computers; c) prior art inconvenient, bulky, and expensive bodysuits; d) prior art unwieldy manipulatable devices and/or exoskeleton devices requiring attachment to a user's body, limbs, or fingers; e) prior art one-way communication devices for robotic controls, with or without forcefeedback systems; f) prior art complicated and inconvenient wearable haptic glove devices; f) prior art focus on fine tactile devices related to feeling remote or onscreen objects; g) prior art Braille and other tactile-based language systems; h) prior art focus of interacting with computer software generated games and virtual reality settings; j) prior art systems and/or devices requiring complex tracking and location devices and systems; k) prior art systems requiring networked or Internet connected computers; l) prior art limited user interface input and/or input/output devices or controllers, such as mice, joysticks, and steering wheels designed for computer or machine interaction, i.e., not designed for human-to-human interaction; m) prior art focus on electromechanical systems and/or devices for reproduction of pre-recorded tactile sensations related to onscreen events and objects; n) limited integration by the prior art of passive tactile designs with powered physical action displays and systems; o) limited development by the prior of live remote controlled delivery of various energy forms, via powered interactive physical displays, to humans or animals for health treatments, therapy, muscle toning, etc.

Figure 1:
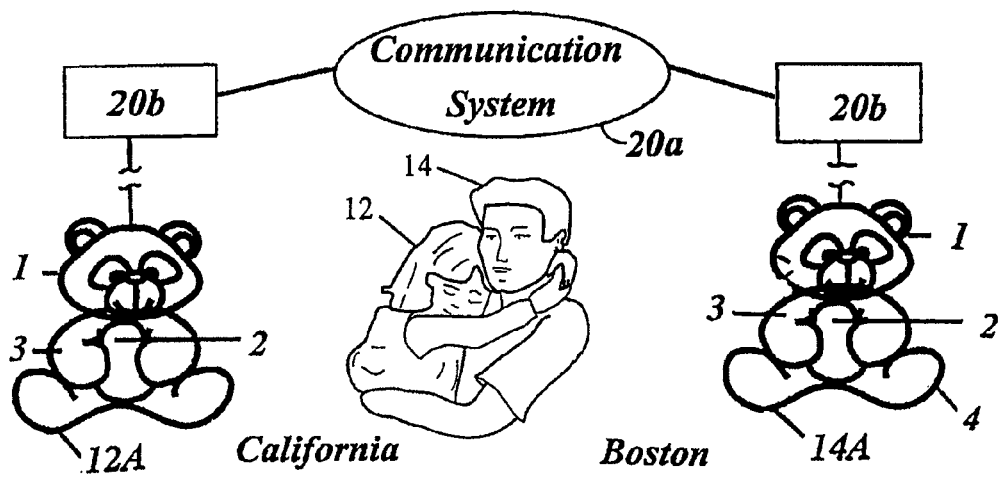
FIG. 1 is a combination pictorial and block diagram representing the exchange of remote hugs between a father in Boston and his daughter in California ("together", in their imaginations only). They are each using communicating teddy bears equipped with powered animate display arms and input chest transducers.

FIG. 1 shows a father in Boston 14 and his daughter in California 12 ("together", only in their imaginations) giving and receiving hugs via an embodiment represented by teddy bears 12A and 14A. The bears are equipped with powered physical display arms 3, moveably attached to bear structure 1. The hugging and huggable bears are responsive to at least the incoming signals produced by the chest transducers 2 from each other's teddy bear. In some embodiments, the bear's fur-type covering 4 surrounds the structure 1 except for the bears eyes, energy source and/or possible communication access areas, etc.

The teddy bears are either wired or wirelessly connected to local communication end devices 20b that are connected to communication system 20a. Alternatively, they are wired or wirelessly connected directly to 20a, or in a local setting, the bears may be equipped to communicate directly, wherein communication system 20a is combination of the bears' transceivers or a wired or a physical tube connection (for fluid powered systems). For bi-directional communications, 20a may be of any type of communication system such as a telephone connection, local two-way RF or IR, networked computers, cellular antennas, satellites, etc. Other embodiments may only require a one-way communication connection or no remote communication capability.

Additionally, the bears may also communicate with dissimilar devices, or the bears may be enjoyed singularly for one-on-one physical interaction with a user, e.g., hug the bear and the bear responds by hugging. The bears' physical displays may take other forms and may deliver other forms of energy. The bears may be powered by any convenient energy source. Alternatively, dad may send a hug or other display information by using a distinct device, although he won't receive a hug in return. Optionally, dad can have prerecorded his hugs and Suzy can have enjoyed such hugs in her dad's absence. Suzy can also use her bear to interact and receive hugs via live or recorded Internet, TV, radio, or tapes, CDs and other programming.

The illustration represents only one possible form that the present invention may take, out of many possibilities related to toys, medical devices, games, and as further mentioned herein.

Figure 2:
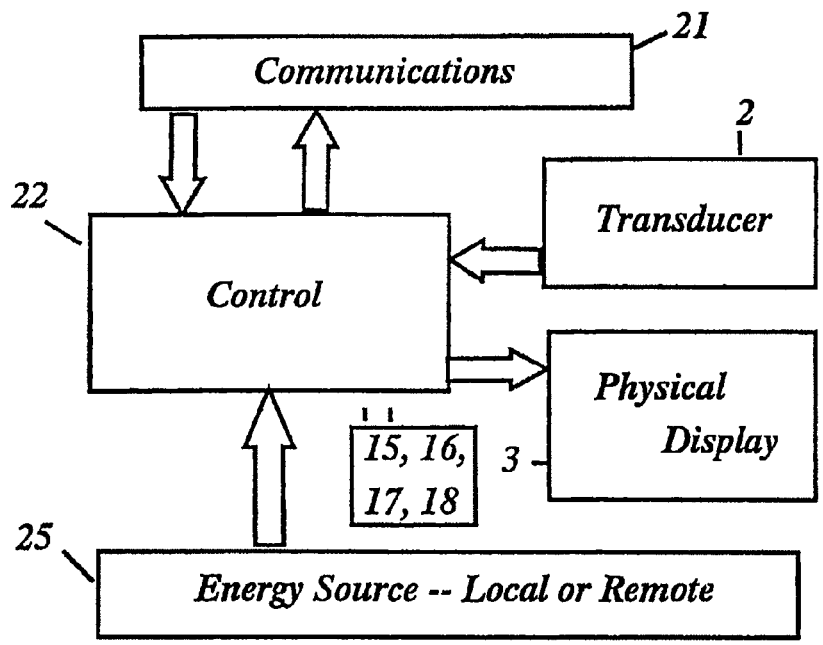
FIG. 2 is a block circuit diagram with components that may be selected for use in devices such as the hugging and huggable teddy bears, pictured in FIG. 1, and as generally adaptable for many other embodiments, a few of which are described later.

FIG. 2 is a block diagram showing a circuit example of connected components that may be applied to the teddy bear embodiment shown in FIG. 1. These or similar components and circuitry is generally adaptable to other embodiments.

Information (analog and/or digital) may enter control 22 via one or more inputs: communications 21, physical transducer 2 or auxiliary inputs (15-18). In the example shown in FIG. 1, daughter Suzy 12 hugs her teddy bear 12A, thereby inputting information to control 22 via the bear's chest-located transducer 2. Suzy's hug information leaves her bear via transceiver 21, and arrives at Suzy's Dad's bear 14A's transceiver 21, via local communication end devices 20b (when required) and communication system 20a. Dad's bear's control 22 acts on the incoming information from 21 by activating physical display 3, which delivers Suzy's hug to her dad. The process works in the other direction when dad sends hugs to Suzy. The respective teddy bears are powered by a local or remote energy source 25.

Transducer 2 is selectable from general group of components, also known by several other names, such as sensors, etc. In some applications, one or more combination devices may perform the functions of transducers 2 and physical animate display 3. Control 22 design and sub-components (not shown), such as microprocessors, analog-digital (A/D) converters, ROM and RAM, and newer types integrated chips may be selected by product designers as needed for various applications and/or as additional media and other options demand.

In certain embodiments, remote communications 21 may be a wired or wireless connection for signals from and/or to handheld or other remote controls or a remote energy source. Communications 21, as required in the application shown in FIG. 1, is a RF transceiver for connection to various types of communication systems, represented by 20a. In other possible designs, control 22 may also perform functions associated with communications 21. Distinct devices may perform one or more of the control 22 functions, and/or one or more of the other component functions. Movement and/or force and safety limits per well-known physical and/or electronic-based designs (not shown) may be incorporated into various embodiments.

Dad and Suzy preferably may also communicate by telephone, videophones, or via a computer-based audiovisual connection while they exchange hugs. Alternatively, one or more of the teddy bears may have a telephone or a videophone/camera and/or computer integrated into its body, controls, and/or functions.

The physical actively of hugging via teddy bears, stuffed animals/characters, dolls, toys, etc. is just one example of the type of activity that may be remotely or locally accomplished via many different embodiments of the present invention.

Although the various descriptions herein concentrate on the inputting and/or outputting (I/O) of animate physical action and other forms of energy, one should remember that the I/O and/or remote communication of information related to other media may be used in alternative embodiments related to voice, audio, and/or text, etc. may be connected and/or used with the present invention. Alternatively, the functions, features, circuitry, structures and components described herein may be adapted or integrated into distinct new host devices, or vice versa.

Figure 3:
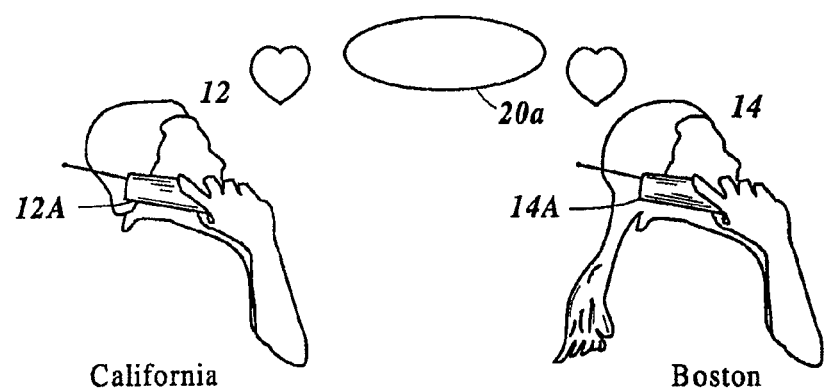
FIG. 3 is a pictorial representation of remotely located persons using the present invention integrated into telephones. This allows the couple to send and receive hand squeezes during their conversation by squeezing (input) their handset to transmit the physical gesture as a signal. Upon receipt of a squeeze signal, the recipient's handset expands (output) representing the incoming gesture, and/or another physical display information.

FIG. 3 represents two persons 12 and 14 (can be more than two) using a pair of the present inventions integrated into cellular type phones 12A and 14A. This allows the couple to send and/or receive, for example only, hand squeezes during their conversation by squeezing their handset (information input via transducer 2) to send physical gestures (information output via 21, shown in FIG. 2). Upon receipt of the physical information, their handsets expand via animate displays 3, representing the incoming gesture. Animate physical displays 3 may also be activated via local control or via remote distinct devices.

For example, a physical action may be transmitted from a regular phone or other distinct device by keying in or otherwise sending a signal to the present invention, which displays a physical or electro mechanical action. The action is responsive to sender's real-time live input and may also coordinate with other communication media. Physical actions may include any action or movement that impacts or otherwise causes a biophysical change of the body or limb of a receiving living being, which may be delivered by various energy forms such as electro mechanical, electronic, pneumatic, hydraulic, etc. The illustration represents only one possible form that the present invention may take, out of many possibilities related to toys, medical devices, games and as further mentioned herein.

Figure 4:
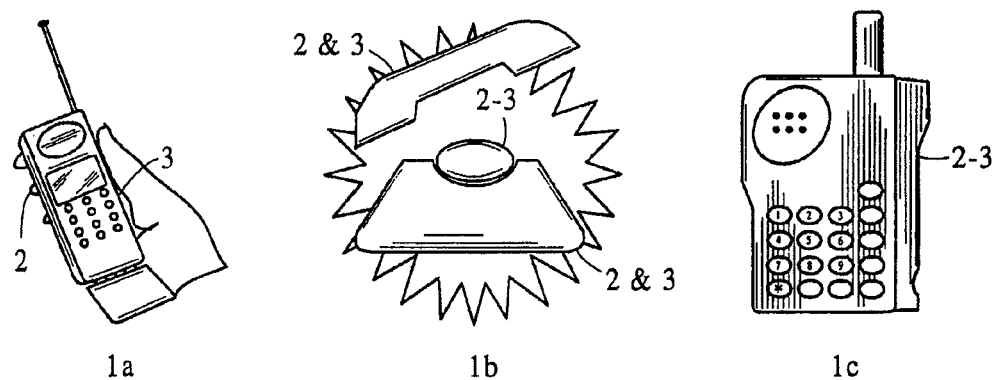
FIG. 4 is a pictorial representation of different various ways animate displays may be integrated with phone devices.

FIG. 4 is a pictorial diagram of examples of three different types of phones that might be being used in FIG. 3 or in other applications. A cell phone is represented by 1a, which shows that the input transducer 2 may be located on one side, and that the physical display may be located on the opposite side of the handset (or visa versa, or 2 and 3 may be a combined component). A two-way radio-type device is shown in 1c, which shows that the input transducer 2 and the physical display 3 may be combined into one movable member shown on the right side of the device (or visa versa). Three different approaches are represented by 1b, which generally represents wired or wireless phones: first, the base may contain the structures and functions related to 2 and 3 (block diagram of base); second, the handset may alternatively contain 2 and 3; and thirdly, a small squeezable and expandable ball or other shaped object may contain and/or deliver the functions of 3 and/or 2. The ball may be wireless or tethered by wires or a pneumatic or hydraulic tube, etc.

Alternatively, the base may contain some of the components, while the ball, handset, or multiple display devices are tethered or wirelessly connected to the base.

The apparatuses described within this document are general examples of numerous other embodiments not described or illustrated. Any and all such various forms and embodiments may be either self-contained or not, or may be integrated into distinct devices, or visa versa. For example only, other such applicable devices that can incorporate this invention, or visa versa, or that this invention may otherwise be operated in conjunction with, are personal digital assistants (PDAs), desktop, laptop or handheld computers and computer peripherals, TVs, radios, pagers, GPS, Internet access devices, electronic or other games, virtual reality devices, automobile steering wheels, and other automotive/motorcycle structures, exercise machines, and other adaptable structures and/or devices or technologies.

Figure 5:
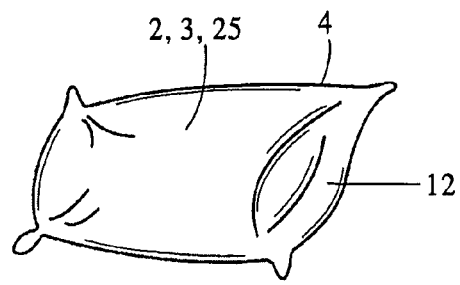
FIG. 5 is a pictorial representation of a powered pillow that expands in the user's arms responsive to the user hugging the pillow and/or responsive other input information.

FIG. 5 is a pictorial and block representation of the self-contained version of the powered expanding pillow as being used by person 12. Transducer 2, physical display 3, and energy source 25 are contained by the covering or enclosure 4. Alternatively, one or more functional means, such as energy source 25, may be remotely located, and said pillow-type apparatus may be wireless and/or tethered by wires or pneumatic or hydraulic hose, etc. Additionally, other versions of the apparatus may be remotely controlled via energy and/or signal information and/or also capable of transmitting information per communications 21 (shown in FIG. 2) or another connection (not shown). The basic functional operations may be performed by the components shown in FIG. 7 as described below, or for more complex operations and/or communications, by some adaptation of the circuit represented by FIG. 2, described above. Size and shape may be change as necessary for design of other forms of the apparatus, which may be as small as or smaller than a hand-held ball or other shape. Additionally, the apparatus components, functionality, and/or features may be integrated into distinct devices, and visa versa. The illustration represents only one possible form that the present invention may take, out of many possibilities related to toys, medical devices, games, and as further mentioned herein.

Figure 6:
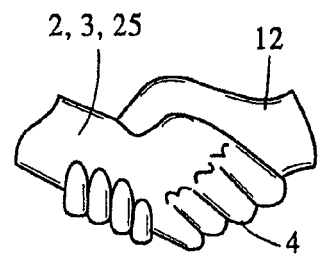
FIG. 6 is a pictorial representation of a powered hand that gives the user's hand a squeeze responsive to the user squeezing the hand device, and/or responsive to other information.

FIG. 6 is a pictorial representation of a self-contained powered hand being used by person 12. Transducer 2, physical display 3 and energy source 25 is contained by partial covering or enclosure 4. Alternatively, one or more functional means may be remotely located, and said hand-type apparatus may be wireless and/or tethered by wires or pneumatic or hydraulic hose, etc. Additionally, other versions may be remotely controlled and/or capable of transmitting information via communications 21 in FIG. 7. The basic functional operations may be performed by the components shown in FIG. 7 as described below, or for more complex operations and/or communications, by an adaptation of the components and circuit shown in FIG. 2, described above. Size, shape, enclosures and coverings may be changed as necessary for other forms of the apparatus, or for different size users, etc. Additionally, the apparatus components, functionality, and/or features may be integrated into distinct devices, and visa versa. The illustration represents only one possible form that the present invention may take, out of many possibilities related to toys, medical devices, games, and as further mentioned herein.

Figure 7:
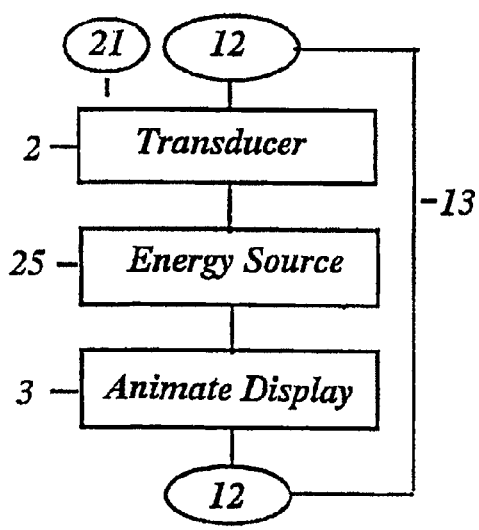
FIG. 7 is a block diagram of the user physical-machine interaction and the components that may be selected for use in many devices, including such devices as pictured in FIGS. 5,6 and 8.
Figure 8:
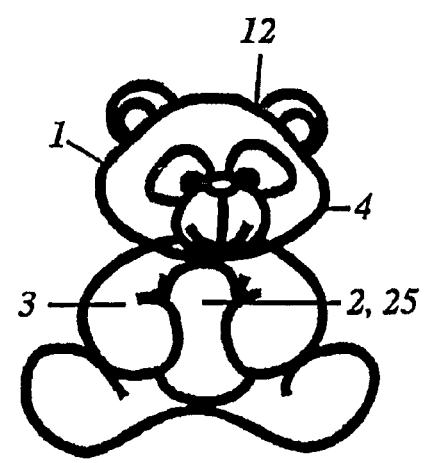
FIG. 8 is a pictorial representation of a powered teddy bear that gives the user a hug, for instance, responsive to the user hugging the bear, and/or to other input information.

FIG. 7 is a block circuit diagram with basic components that may be selected for the apparatus generally represented in FIGS. 5, 6 and 8. The user is represented by 12. The human intelligence-driven sensory feedback control of the machine is represented by line 13. This natural bio-control system applies to many of the applications and forms of the present invention, and it is a particular natural advantage leveraged in the design of many of the remote interactive applications. The user sends energy to the animate display 3 by activating transducer 2, by squeezing or other physical input, and/or energy may flow to power the animate display 3 via remote control signals and/or energy connection 21. The animate display delivers various forms of action to the user(s), depending on the form and intended function of the apparatus. Energy source 25 may either be local or remote. The transducer may perform more than one function, such as sensing incoming motion, signals, or energy flow (or it may simply function as a switch or valve), and it may also have the combined function as an actuator for the animate display. The illustration represents only one circuit and set of components that the present invention may use, out of many possible circuits and combinations of components. Distinct devices may optionally perform any portion of such functions. For instance generally, when any form of the powered display is pneumatically or hydraulically powered, the display may only require a hose connection, while other functions may be performed remotely.

FIG. 8 is a pictorial representation of a powered teddy bear being used by person 12. Partial covering or enclosure 4 contains transducer 2 and energy source 25. Physical display 3, i.e., the bear's arm(s), is movably connected to bear structure 1. Alternatively, one or more functional means may be remotely located, and said toy-type apparatus may be wireless and/or tethered by wires or pneumatic or hydraulic hose, etc. Additionally, other versions may be remotely controlled and/or capable of transmitting information via communications 21 (shown in FIG. 2). The basic functional operations may be performed by the components shown in FIG. 7 as described below, or for more complex operations and/or communications, by an adaptation of the components and circuit shown in FIG. 2, described above. Size, shape, and characteristics may be changed as necessary for design of other forms of the apparatus or for various size users. Additionally, the apparatus components, functionality, and/or features may be integrated into distinct devices, and visa versa. The illustration represents only one possible form that the present invention may take, out of many possibilities related to toys, medical devices, games, and as further mentioned herein.

Figure 9:
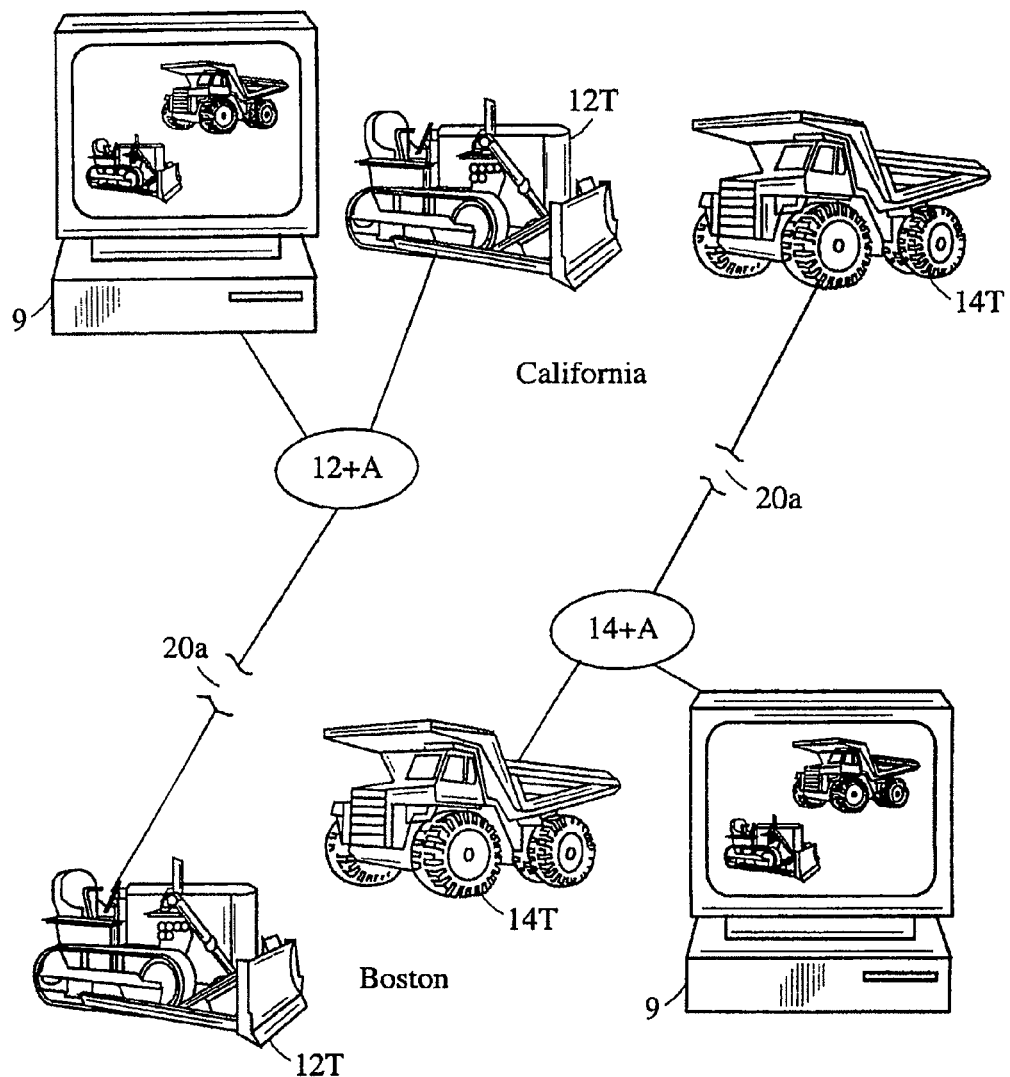
FIG. 9 is a pictorial representation of a pair of toy tractors and a pair of toy trucks connected to a communication system via the apparatuses' transceivers. The boy in Boston controls both tractors, and the boy or girl in California controls both trucks. The cousins, for instance, enjoy playing together with their respective toy apparatuses, while optionally talking and viewing the activity in each other's room, either directly or via monitors and video cameras.

FIG. 9 is a pictorial representation of a pair of toy tractors 12T and a pair of toy trucks 14T (12T and 14T are animate displays) connected to a communication system 20a via the apparatus and the boys/girls or users. The apparatuses and users are shown as 12+A and 14+A. The boy in Boston 14 controls both trucks 14T and 14T, while the girl in California controls both tractors 12T and 12T. The users enjoy playing together with their respective toy apparatuses, while optionally talking and viewing the activity in each other's room via monitors/cameras 9, which may be a video phone system, or two computers on the phone system, or otherwise networked, etc. The basic adaptable components and circuitry for each apparatus is shown in block diagram FIG. 2. The components and circuits may be expanded for adding additional functions or media 15-18, FIG. 2. The trucks and tractors, or other forms of the display apparatus described herein, may optionally be equipped with record and playback means, machine vision, microphones, speakers, radar, ground positioning systems, smoke/smell devices, etc. (15-18, FIG. 2).

The trucks and tractors may be controlled directly by the users' hands, etc. or via local remote controls 12+A and 14+A. The kids each control their one local toy and their respective paired remote toy. In other applications, there may be as few as one truck or tractor or as many toys as can be interactively controlled by one or more users via communications 21 (shown in FIG. 2) and communication system 20a. The users may also communicate via speech/sound and/or visually. Optionally, the toys or other embodiments described herein may be controlled by voice.

The trucks and tractors are just one example of the many possible forms and applications of the present invention. Any of which may be controlled directly or indirectly while connected wirelessly or tethered via wires or other hoses, etc. to one-way or bi-directional communication systems and or controllers, phones, computers, etc.

Applications may include, for example only remotely played soccer and hockey games, board games, one-arm bandits, blackjack games, craps, interactive dolls, exercise devices, etc.

Figure 10:
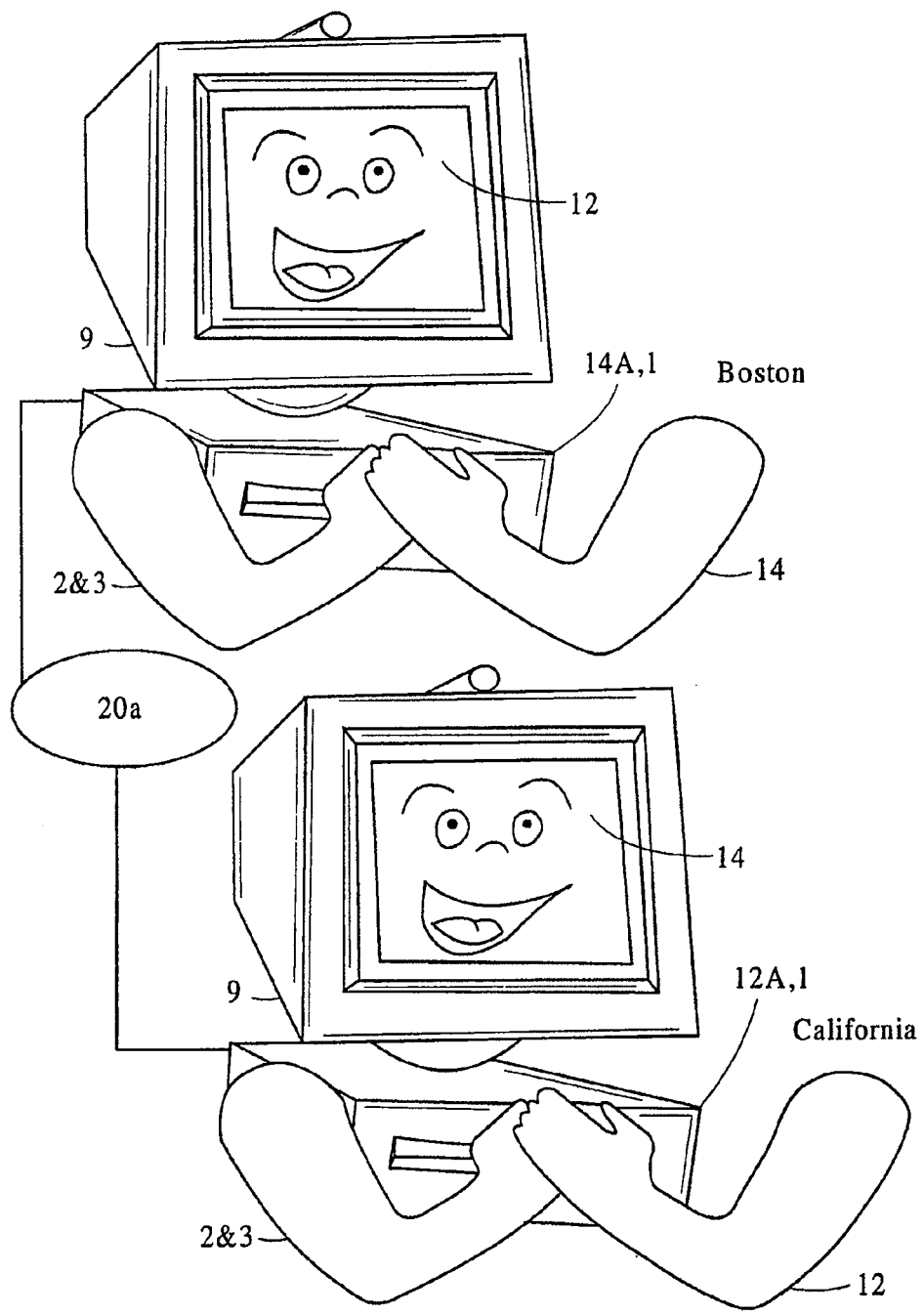
FIG. 10 is a pictorial representation of two people (their faces are on the monitors), one in Boston and the other in California. They are communicating physically, visually, and by voice.

FIG. 10 is a pictorial representation of two apparatuses 12A and 14A with animate display arms 3 movably connected to respective associated structures 1. Optional monitors/cameras 9 display the users' respective live images, or may optionally display prerecorded information, or virtual objects, scenes or a hybrid blend. Preferably, the users are communicating at least by voice, if not audiovisually. Boston user's live arm 14 interacts with his machines transducer 2 and associated animate display arm 3, which is remotely responsive to California user's live input via his/her interaction with his machine's transducer 2 and animate display 3, and visa versa. Display 3 may take any appropriate form and perform any appropriate actions, motions, and/or other display and deliver other forms of energy as further described elsewhere herein. Generally, the illustrations may or may not represent computers or converted computers.

Example adaptable components and circuitry are shown in the block diagram of FIG. 2.

Any expanded or modified control scheme and/or communication method or type of signals or information may be applied as desired or as applicable to various other applications. There may be as few as one animate display per machine/apparatus, or as many as desired by one or more users. Such arms 3 are only meant to represent one of many possible forms and applications of the display mean. The illustrated arms can be used for remote or local games of arm wrestling.

Other forms of powered displays may be used for remotely interactive tug-a-wars, hand holding, handshakes, medical devices, therapy devices, industrial or commercial training, education, interactive advertising concepts, and world prayer. Additionally, such interactive displays may be adapted or integrated into many existing types of games, including adding an additional spontaneous physical and/or electronic interactive level to many of the present day and future multi-player online games, virtual reality and other types of activities. These additional live interactive levels can also integrated into the game play, used as a "got ya!" tap or other physical gesture. This new added spontaneous level would give the feeling of playing next to someone, whether or not it is also associated with a new level of interactive live sound and live player images. For example, the new spontaneous physical interactive level can also include a live picture-in-picture and/or live sound on top of the pre-recorded game sounds or some combination thereof. This live real-time physical interaction level may also include use of the award vault devices introduced above. The vaults can also be released by the pre-recorded program in response to certain obtained goals, or in combination with player release.

Figure 11:
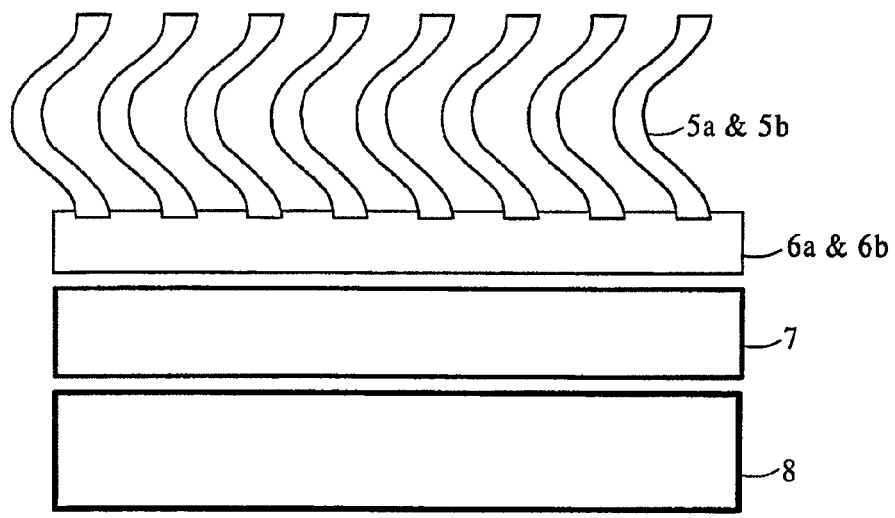
FIG. 11 is a block diagram depicting a section of a physical or energy display showing various surface and subsurface structures.

FIG. 11 represents optional features that can be used alone or together and incorporated into the present invention's structures, or incorporated into distinct devices.

Structures 5a, 6a, 7 and 8 represent a fine to deep tactile-enhanced generic powered and/or passive physical display section. Curved sub-structures 5a specifically represent delivery means for one or more fine tactile stimulation means. Block 6a represents the outer covering or enclosure means, while also acting as a means of attachment and/or energy distribution means for curved sub-structures 5a. Sub-section 7 represents an intermediate spongy to semi-firm layer, while underlying supporting block 8 represents a firmer bonelike supporting structure.

Note that FIG. 11 is also used to represent means for the delivery of pneumatic, electric, hydraulic, and/or electronic, etc. display information to the skin, limbs, or body of one or more end users. For example only, 5b represents one or more electrodes and/or air or hydraulic delivery tube(s), while 6b represents the related appropriate energy conduit supplying 5b structures with energy. These new optional energy delivery and/or multilevel tactile delivery and passive responsive structures broaden the ways energy can be applied to a body. They also broaden the tactile interactive range of both the display apparatuses (shown elsewhere as 3) and the user interactive covering or enclosure portions of certain embodiments described herein. Additionally, the various forms of energy can be combined or mixed and delivered either to a biophysical structure by separate dedicated displays, or by new multienergy form hybrid display. A section of such a new hybrid display is generally represented by using or combining the sub-structure functions of 5a and 5b, etc. in FIG. 11.

Figure 12:
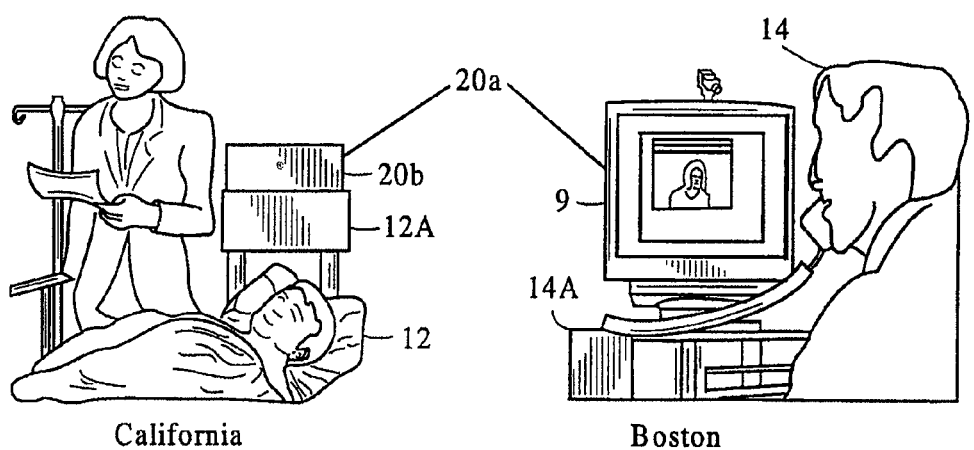
FIG. 12 is a pictorial representation of a doctor or therapist, etc. remotely interacting with a patient while also video conferencing with the nurse and/or patient.

FIG. 12 generally represents remotely located doctors, therapists, nurses, eldercare professionals, and others using remotely controlled physical and/or electronically interactive devices to help or interact with people or animals with or without locally available human assistants. For example only, a doctor may test the vital signs, strength and/or muscle/nerve reactions of a remote patient while preferably video conferencing with a helper or the patient. Nurses may videoconference and physically and/or electronically interact, treat or help patients perform various tasks.

Home based patients may be provided with remotely released medicine vaults under the control and supervision of a qualified remotely located person, whom may also verify pill and/or liquid ingestion, etc. One remote therapist may work with several patients at the same time allowing the patients to remain in their respective dwellings. Various forms of physically and/or electronically interactive devices may be designed and manufactured as required for various recovery, therapeutic, or many other remote interactive situations (hands on customer service, etc.).

Such numerous possible end-use powered display apparatuses are broadly represented by block diagram 12A in FIG. 12. In many applications, a plurality of various display apparatus may be employed and controlled by one or more supervisors, leaders, or users.

The following additional embodiments are within the scope of the present disclosure:

1. A powered interactive physical display particularly for interaction with living beings comprising:
    (a) an energy source;
    (b) a transducer selected from the group consisting of transducers, sensors, switches, actuators, generators, motors;
    (c) a physical display means, powered by said energy source means, whereby for example only, a powered pillow, which responsively expands or displays other physical action when a user gives the pillow a hug or other physical contact, generally represented by FIGS. 5 through 7.

2. A powered interactive display as recited in embodiment 1, further comprising a structure, generally as a distinct structure from said physical display means, whereby for example only, said structure means may be represented by the body of a huggable and hugging teddy bear to which at least one powered physical display means movably connects, which enables the apparatus to hug or grasp a user or display other physical action when the user activates the bear by giving the bear a hug or other physical contact, generally represented by structures 1a, 1b, and 1c, in FIG. 4 and by 1 in FIG. 8 and by 1 in FIG. 10.

3. A powered interactive physical display apparatus as recited in embodiment 1, further comprising a covering or enclosure means, at least partially covering or enclosing said apparatus, wherein, for example, teddy bear fur material 4, in FIG. 8 represents said covering or enclosure means.

4. A powered interactive physical display apparatus as recited in embodiment 2, further comprising a covering or enclosure means, at least partially covering or enclosing said apparatus, wherein, for example, teddy bear fur material 4, in FIG. 8 represents said covering or enclosure means.

5. A powered interactive physical display apparatus as recited in embodiment 3, further comprising means to remove and replace said covering or enclosure means, wherein, for example, pillowcase 4, in FIG. 5 represents said replaceable covering or enclosure means.

6. A powered interactive physical display apparatus as recited in embodiment 4, further comprising means to remove and replace said covering or enclosure means, wherein, for example, pillowcase 4, in FIG. 5 represents said replaceable covering or enclosure means.

7. A powered interactive physical display apparatus as recited in embodiment 3, further comprising: (a) various interactive texture means, on, near, or part of the surface of said covering or enclosure means; (b) one or more subsurface structure means, selected from material means of various densities, elastic properties and other appropriate characteristics, whereby the enhanced display apparatus is capable of providing a range of physical sensations to a user, from fine tactile to various greater degrees of movement and forces, the full range available in the powered operational state, and a more limited passive reactive range while the apparatus is in a non-powered or partially powered state, the choice of surface textures and substructures dictated by the intended use of the display means, and/or the intended approximate reproduction of selected biophysical or non-biophysical textures and/or structures, a section of the enhanced physical display is generally represented by simulated hair 5a and sub-structures 6a, 7 and 8 in FIG. 11.

8. A powered interactive physical display apparatus as recited in embodiment 4, further comprising: (a) various interactive texture means, on, near, or part of the surface of said covering or enclosure means; (b) one or more subsurface structure means, selected from material means of various densities, elastic properties and other appropriate characteristics, whereby the enhanced display apparatus is capable of providing a range of physical sensations to a user, from fine tactile to various greater degrees of movement and forces, the full range available in the powered operational state, and a more limited passive reactive range while the apparatus is in a non-powered or partially powered state, the choice of surface textures and substructures dictated by the intended use of the display means, and/or the intended approximate reproduction of selected biophysical or non-biophysical textures and/or structures, a section of the enhanced physical display is generally represented by simulated hair 5a and sub-structures 6a, 7 and 8 in FIG. 11.

9. A powered interactive physical display apparatus as recited in embodiment 1, further comprising an input means, for receiving energy or information, whereby for example only, said apparatus might be controlled remotely by a remote energy or control source, generally represented by FIG. 7 with block diagram 21 connected.

10. A powered interactive physical display apparatus as recited in embodiment 2, further comprising an input means, for receiving energy or information, whereby for example only, said apparatus might be controlled remotely by a remote energy or control source, generally represented by FIG. 7 with block diagram 21 connected.

11. A powered interactive physical display apparatus as recited in embodiment 1, further comprising a local or remote control means, whereby apparatus control may be generally represented by block diagram 22 in FIG. 2.

12. A powered interactive physical display apparatus as recited in embodiment 2, further comprising a local or remote control means, whereby apparatus control may be generally represented by block diagram 22 in FIG. 2.

13. A powered interactive physical display apparatus as recited in embodiment 11, further comprising means to deliver electrical energy to a being, whereby an electrode and wire are generally represented by block diagrams 5b and 6b in FIG. 11.

14. A powered interactive physical display apparatus as recited in embodiment 12, further comprising means to deliver electrical energy to a being, whereby an electrode and wire are generally represented by block diagrams 5b and 6b in FIG. 11.

15. A powered interactive physical display apparatus as recited in embodiment 11, further comprising means to deliver or remove fluids to or from a being, whereby a hollow tube and hollow conduit are generally represented respectively by block diagrams 5b and 6b in FIG. 11.

16. A powered interactive physical display apparatus as recited in embodiment 12, further comprising means to deliver or remove fluids to or from a being, whereby a hollow tube and hollow conduit are generally represented respectively by block diagrams 5b and 6b in FIG. 11.

17. A powered interactive physical display apparatus as recited in embodiment 11, further comprising a transceiving communication means, whereby for example only, signals may be sent and received and such information may be converted and processed as necessary by control means, said communication means generally represented by block diagram 21 in FIG. 2.

18. A powered interactive physical display apparatus as recited in embodiment 12, further comprising a transceiving communication means, whereby for example only, signals may be sent and received and such information may be converted and processed as necessary by control means, said communication means generally represented by block diagram 21 in FIG. 2.

19. A powered interactive physical display apparatus as recited in embodiment 11, further comprising a recording and playback means, whereby, said recording and playback means is generally represented by block diagram 15 in FIG. 2.

20. A powered interactive physical display apparatus as recited in embodiment 12, further comprising a recording and playback means, whereby, said recording and playback means is generally represented by block diagram 15 in FIG. 2.

21. A powered interactive physical display apparatus as recited in embodiments 11, further comprising an additional or hybrid display means for displaying other energy or other media, whereby second display means is for energy forms or media not displayed by said physical display means, said second display means generally represented by block diagram 16 of FIG. 2.

22. A powered interactive physical display apparatus as recited in embodiments 12, further comprising an additional or hybrid display means for displaying other energy or other media, whereby additional display means is for energy forms or media not displayed by said physical display means, said second display means generally represented by block diagram 16 of FIG. 2.

23. A method for transferring various forms of energy to remote persons, the method comprising of providing at least one person with an appropriate version of the powered interactive physical display apparatus embodied herein, connecting said apparatus to a remote controlling and transmitting device, via at least a one-way communication connection.

24. A method for providing centrally controlled energy display services to remote individuals or groups, the method comprising the following steps: a) providing one or more remote humans with a version of the powered interactive physical display apparatus equipped with communication means, as previously embodied; b) connecting at least one said display apparatus to a communication system for communication with a central control center; c) transmitting control information from said central control center to one or more said remote powered interactive physical display apparatus, whereby for example only, as generally represented in FIG. 12, for providing remote controlled interactive physical services, such as medical, therapy, chiropractic, eldercare, childcare, exercise, electronic stimulation and treatments, entertainment, games, gambling, contests, etc.

25. A method for integrating, in whole or in part, the functional means, or method of integrating physical display functions related to the various versions of the powered interactive physical display apparatus, as embodied and suggested herein, with distinct devices and/or distinct programming, whereby for example only, to enable the addition of one or more physical display capabilities, communications or remote control capabilities to known devices (not shown), programs and systems, which lack one or more such capabilities, such candidate devices, systems and related programming as: medical devices, therapy devices, rehabilitation devices, monitoring devices, chiropractic devices, massage devices, exercise devices, phones, pagers, Internet access devices, electronic stimulation devices, medicine and reward vaults, entertainment devices, thermal therapy devices, virtual reality systems, single and multi-player games, gambling devices, computer systems, exercise devices, sleep enhancing devices, magnetic, light, radio frequency and infrared treatment and therapy devices, vital signs and breathing monitoring and alarm devices, automotive systems and devices, sporting devices, contest related devices, devices, toys, dolls, stuffed animals and characters, eldercare, childcare devices, etc.

The foregoing descriptions of embodiments have been presented for purposes of illustration and description only. Some of the described embodiments can be used and enjoyed without the limitations and disadvantages associated with the prior art. Some names and/or definitions applied to the various types of powered displays were used to help avoid confusion. In various types of powered energy displays disclosed herein, regardless of the energy form delivered, a responsive physical or mechanical change takes place.

The examples and limited descriptions herein are not intended to be exhaustive or in any way limit the invention to the forms disclosed and suggested, and obviously many modifications and variations are possible in light of the above teachings. The embodiments were chosen and described in order to explain and illustrate, in an economical manner, the basic principles of the invention and a few forms of its practical applications.

This disclosure is meant to be read and understood as a whole. If some descriptive point or other information is presented in one area but not another, such information and descriptions are to be applied generally as appropriate to other discussions and descriptions. At least some of the components and materials used to construct embodiments described herein, whether such components and materials are electronic, pneumatic, hydraulic, mechanical, etc., are commercially available. The embodiments do not limit the scope of the inventions, which is defined by the claims appended hereto and their equivalents.

What is claimed is:

1. A method for treating a patient comprising steps of:
   providing a first device at a patient location, the first device being an internet and networking capable multimedia mobile electronic device comprising at least one each of a physical output display and an input transducer;
   providing a second device at a remote location, wherein the second device is distinct and separate from the first device;
   establishing an audio-video and data communication connection between the patient location and the remote location;
   conducting an audio-video conference between the patient at the patient location and a treatment provider at the remote location, wherein the audio-video conference comprises the treatment provider eliciting patient information by verbally interacting with the patient;
   transmitting the patient information from the first device to the second device by way of the audio-video conference;

using the input transducer to measure a patient parameter at the patient location and produce a first signal indicative of the patient parameter, wherein the patient parameter includes at least one vital sign;

transmitting the first signal to the second device;

forming a diagnosis at least partially based on the patient parameter;

using the first signal at the remote location, the diagnosis and the patient information transmitted before, during or after the audio-video conference to determine a treatment and generating a second signal associated with said treatment;

sending said second signal from said second device to said first device to administer a treatment; and using said second signal to cause a physical interaction between the physical output display and the patient.

2. The method of claim 1, wherein the physical output display is configured to be controlled by signals from the first device, without a connection to the second device.

3. The method of claim 1, wherein the signals are transmitted using at least one of an internet connection, a cellular RF connection, a satellite RF connection, a short, medium or long range RF connection, a wired connection and an infrared (IR) connection.

4. The method of claim 1, wherein the first device further comprises a global positioning device (GPS) wherein a location of the first device is displayable at least on the second device.

5. The method of claim 1 wherein the first device includes at least one of a physical display and transducer, which is operatively connected to the first device.

6. The method of claim 1 wherein the first device is capable of measuring and monitoring one or more of multiple vital signs, motion, movement and patient's reactions to stimuli and measuring size of body parts.

7. The method of claim 1 wherein the treatment comprises medicine release.

8. The method of claim 7, further comprising providing a remotely controlled medication release vault at the patient location, wherein the treatment comprises the treatment provider remotely releasing medication stored in the vault.

9. The method of claim 8, wherein the treatment further comprises the treatment provider verifying administration of the medication by the patient.

10. The method of claim 1 wherein the first device is operable to transceive via wire, via radio signals (RF) or via infrared (IR) signals directly with nearby physical display units, transducers, TVs, interactive TVs, and other devices and connect with distant devices using public or private radio transmission systems or by connecting directly or indirectly to the internet.

11. The method of claim 1 wherein the first device provides feedback to the patient and to the second device.

12. The method of claim 1 wherein the first device monitors patient parameters while not connected to the second device and forms a diagnosis based at least in part on at least one measured patient parameter.

13. The method of claim 1 wherein the first device delivers treatments while not connected to the second device.

14. The method of claim 1 wherein the first device functions as emergency call and location device with global positioning device (GPS), wherein a location of the first device can be located from at least the remote location.

15. The method of claim 1, wherein the physical output display outputs a form of energy that causes a biophysical change to body or a limb of a user of the first device.

16. The method of claim 1, wherein the at least one vital sign is selected from the group consisting of strength, muscle reaction and nerve reaction.

17. The method of claim 1, wherein the at least one input transducer is configured to sense a physical gesture performed by a user of the device.

18. The method of claim 1, wherein the at least one input transducer is configured to capture at least one physical gesture performed by a user using at least one camera.

19. The method of claim 1, wherein the at least one input transducer is configured to sense a physical gesture performed by a user to measure the at least one vital sign selected from the group consisting of strength, muscle reaction and nerve reaction.

20. The method of claim 1, wherein the first device is a wireless mobile electronic device.

21. The method of claim 1 wherein electrical energy is used in the treatment.

22. The method of claim 1 wherein magnetic energy is used in the treatment.

23. The method of claim 1 wherein radio frequency is used in the treatment.

24. The method of claim 1 wherein light energy is used in the treatment.

25. The method of claim 1 wherein vibration is used in the treatment.

26. The method of claim 1 wherein pneumatic energy is used in the treatment.

27. The method of claim 1 wherein hydraulic energy is used in the treatment.

28. The method of claim 1 wherein acoustic energy is used in the treatment.

29. The method of claim 1 wherein thermal energy is used in the treatment.

30. The method of claim 1 wherein infrared energy is used in the treatment.

31. The method of claim 1 wherein electronics are used in the treatment.

32. The method of claim 1 wherein laser energy is used in the treatment.

33. The method of claim 1 wherein two or more forms energy are used in the treatment.

34. The method of claim 1 wherein a nutritional release is used in the treatment.

35. The method of claim 1 wherein a treat or other reward is used in the treatment.

36. The method of claim 1, wherein the first device is a mobile telephone.

* * * * *